Jan. 31, 1967  C. C. COVERT  3,301,330
PROPELLER OIL LEVEL CONTROL
Filed Oct. 16, 1964  2 Sheets-Sheet 1
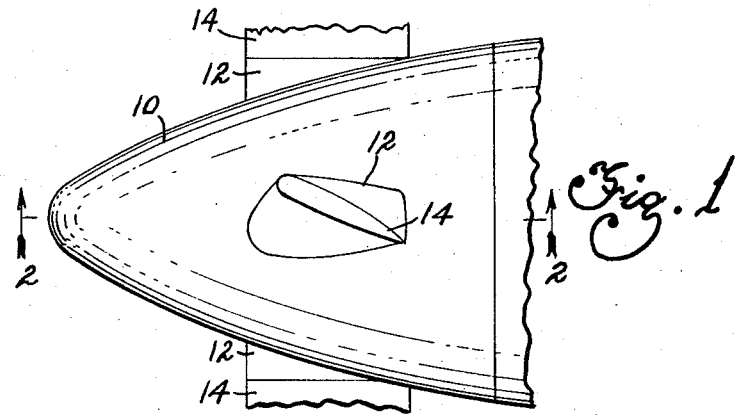
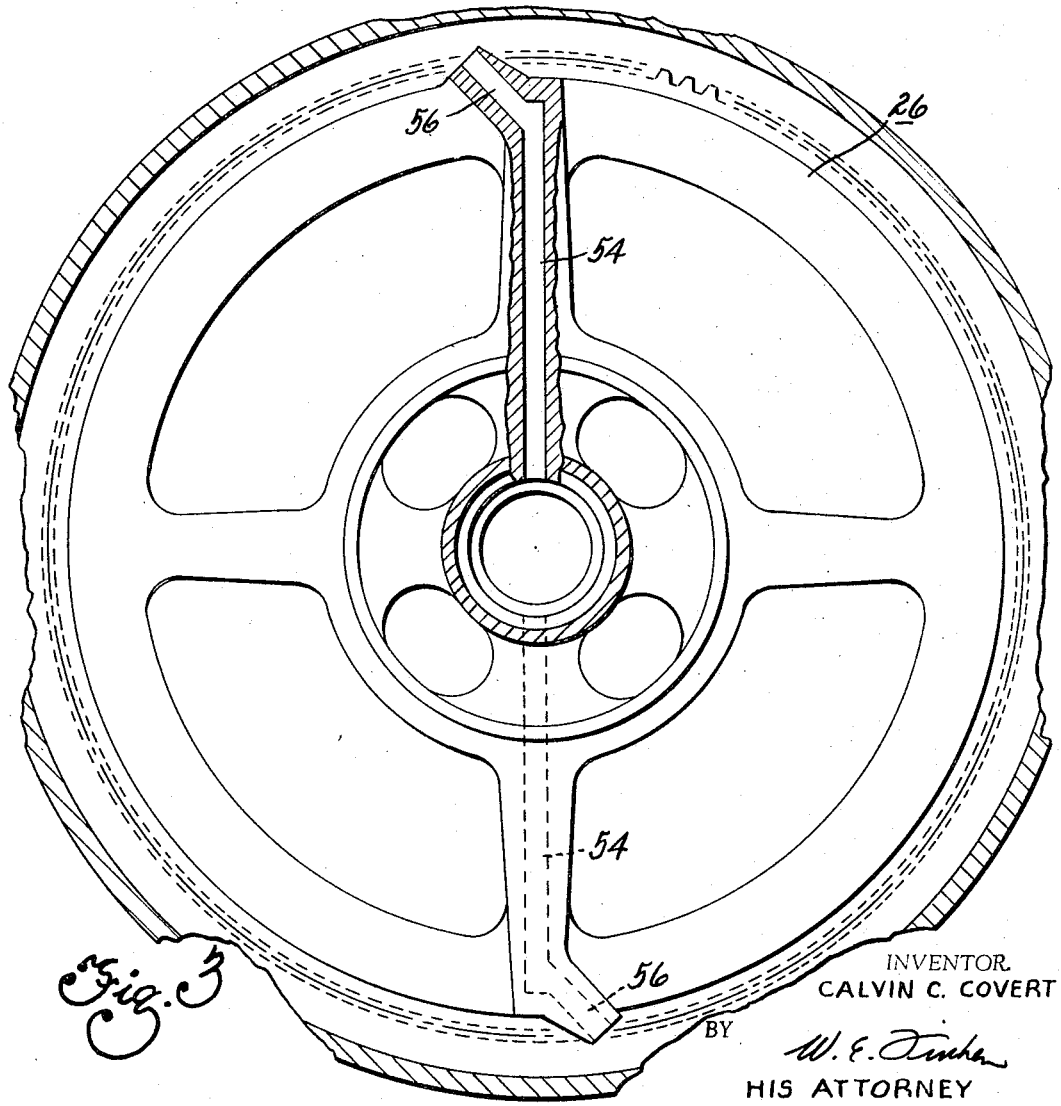
INVENTOR.
CALVIN C. COVERT
BY
HIS ATTORNEY

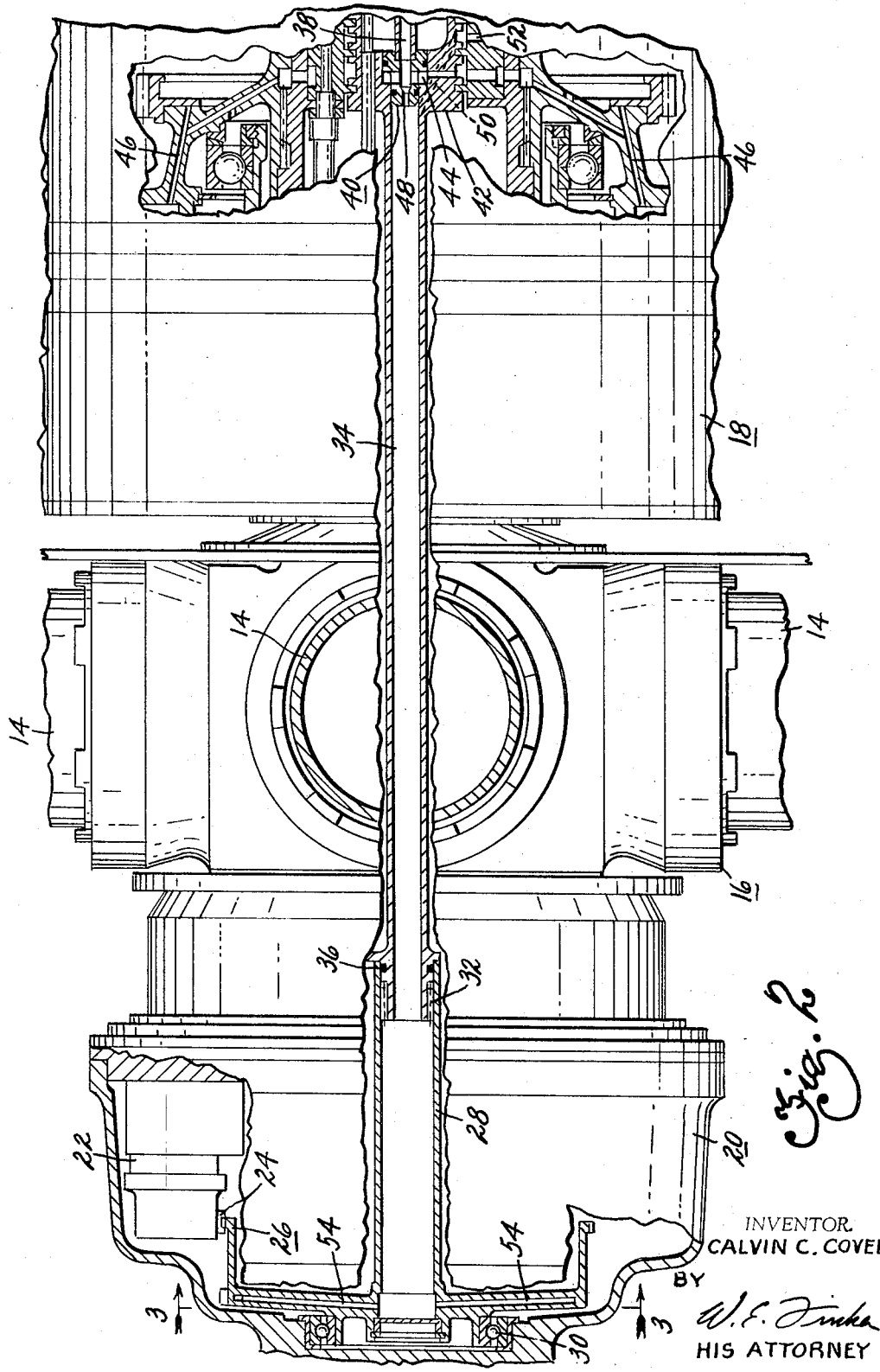

United States Patent Office 3,301,330
Patented Jan. 31, 1967

3,301,330
PROPELLER OIL LEVEL CONTROL
Calvin C. Covert, Indianapolis, Ind., assignor to General Motors Corporation, Detroit, Mich., a corporation of Delaware
Filed Oct. 16, 1964, Ser. No. 404,450
8 Claims. (Cl. 170—160.23)

This invention pertains to hydraulically actuated variable pitch propellers, and particularly to an improved propeller construction embodying means operable to automatically maintain the requisite oil level in a regulator reservoir.

In my Patent No. 3,026,740 a variable pitch propeller is disclosed in which the regulator assembly is mounted in front of the propeller hub so as to rotate with the hub about a stationary shaft assembly which extends axially through the hub. This invention relates to means for maintaining the requisite oil level in such a regulator reservoir during propeller rotation from the gear box lubrication system. Accordingly, among my objects are the provision of means for automatically maintaining the requisite oil level in a rotatable reservior; the further provision of a variable pitch propeller including a lubricating oil supply and means automatically controlling the flow of oil from the supply to a rotatable regulator reservoir so as to maintain the requisite oil level therein; and the still further provision of a propeller of the aforesaid type including scoop tube means in the regulator reservoir for automatically controlling the flow of oil to the reservoir from the lubricating system.

The aforementioned and other objects are accomplished in the present invention by bleeding off a predetermined portion of the lubricating oil system and supplying this portion to a stationary scoop in the rotatable regulator reservoir. When the oil level in the regulator reservoir is normal, the pressure developed at the oil scoop exactly balances the pressure of that portion of the oil bled from the lubrication system thus precluding the flow of oil from the lubricating supply to the regulator reservoir so as to avoid overfilling. However, when the regulator reservoir oil level is below normal the pressure developed at the oil scoop will be less than the regulated pressure bled from the lubricating oil system, and accordingly oil will flow to the regulator reservoir until the oil level therein is again normal.

Further objects and advantages of the present invention will be apparent from the following description, reference being had to the accompanying drawings, wherein a preferred embodiment of the present invention is clearly shown.

In the drawings:

FIGURE 1 is a fragmentary view in elevation of a variable pitch propeller embodying the oil level control of the present invention.

FIGURE 2 is an enlarged fragmentary view partly in section and partly in elevation, with certain parts broken away, taken along line 2—2 of FIGURE 1.

FIGURE 3 is an enlarged view, partly in section and partly in elevation, taken along line 3—3 of FIGURE 2.

Referring to FIGURE 1, a variable pitch aircraft propeller assembly is shown, including a spinner 10 having a plurality of fairing islands 12 through which the shanks of propeller blades 14 project. The spinner 10 encloses the propeller hub, regulator reservoir and gear reduction unit as will be described hereinafter. The pitch adjusting mechanism, which constitutes no part of the present invention, may be of the general type disclosed in Patent No. 2,986,220, and thus may comprise a plurality of hydraulic pumps driven incident to propeller rotation for developing a source of hydraulic fluid under pressure and a control valve system for supplying hydraulic fluid under pressure to individual double acting torque units connected to each propeller blade for rotating the propeller blades about their longitudinal axes to vary the pitch position thereof.

Referring to FIGURE 2, the propeller hub 16 is disposed between the gear reduction unit 18 and the regulator reservoir assembly 20 with the regulator reservoir assembly being mounted in front of the propeller hub. The regulator reservoir assembly 20 is attached to the hub 16 for rotation therewith, and as shown, contains one or more hydraulic pumps 22, each pump having a drive gear 24 that meshes with a stationary pump power gear 26. It is to be understood that each pump 20 rotates with the regulator assembly 22 during propeller rotation about the stationary pump power gear 26 so as to activate the pumps incident to propeller rotation. The pump power gear is formed with an integral hollow shaft extension 28 and is supported by ball bearing means 30 in the regulator reservoir assembly. The hollow extension 28 of the stationary pump power gear is connected by straight splines 32 to a stationary oil supply tube 34 which extends axially through the hub 16 and the gear reduction unit 18. A suitable seal 36 is situated between the juncture of the oil supply tube 34 and the hollow shaft extension 28 of the pump power gear.

Lubricating oil for the gear reduction unit is supplied through an inlet tube 38 at the rear of the gear reduction unit from a regulated supply, not shown, and in a typical propeller assembly lubricating oil is supplied at 65 pounds per minute at a pressure of 70 p.s.i. The oil supply tube 38 connects with a bushing 40 inserted into the end of the stationary oil supply tube 34. The stationary oil supply tube 34 is formed as an integral part of a stationary support structure 42. The bushing 40 has a plurality of circumferentially spaced radial ports 44 that connect with lubricating passages 46 leading to the gear reduction unit. The oil supply to the bushing 40 is divided at the bushing 40 into the gear reduction oil supply of 60 pounds per minute at 50 p.s.i. and the remaining 5 pounds of oil per minute pass through an orifice 48 of the bushing that connects with the oil supply tube 34. The pressure in the oil supply tube 34 is maintained at a constant 8 p.s.i. The stationary support structure 42 is formed with a control orifice 50 interconnecting the oil supply tube 34 with a bearing oil passage 52.

Referring to FIGURE 3, the pump power gear 26 is formed with a pair of diametrically opposed, radially extending passages 54 terminating in scoops 56 oriented at a 45° angle with respect to the radial passages 54 at the periphery of the pump power gear, which passages and scoops constitute scoop tubes. While the scoop tubes are shown integral with the gear 26, they can be made separate and subsequently attached. It is to be understood that when the propeller assembly is rotating, the oil in the regulator reservoir assembly 20 is thrown outwardly due to the centrifugal force and forms a torus, or ring, which, if the oil level is normal, immerses the scoopes 56. The rotating torus of oil which rotates in a clockwise direction relative to the scoop tubes as seen in FIGURE 3, develops a pressure, namely 8 p.s.i. at the scoop tubes, which exactly balances the pressure in the oil supply tube 34 and hub shaft extension 28 which is connected to the scoop tubes during constant speed propeller rotation. Accordingly, the oil from the lubricating system will flow through the control orifice 52 at a rate of 5 pounds per minute at 8 p.s.i. to the bearing lubricating passage 52. However, if the oil level in the regulator reservoir 20 is below normal, a pressure of less than 8 p.s.i. will be developed in the scoop tubes, and accordingly, oil will flow from the tube 34 through the hub shaft extension 28 and through passages 54 and scoops 56 to the regulator reservoir until the pressure is again balanced and the oil level returns to normal. In a particular propeller assembly, it has been found that where the oil scoop tube developed 8 p.s.i. at the normal, or selected, oil level in the oil regulator reservoir, the control orifice should be .062″ in diameter to bleed off the requisite 5 pounds of oil per minute at 8 p.s.i. to the lubricating passage 52.

While the embodiment of the invention as herein disclosed constitutes a preferred form, it is to be understood that other forms might be adopted.

What is claimed is as follows:

1. In combination with a rotatable reservoir structure partially filled with oil, a stationary hollow shaft about which said reservoir structure rotates whereby the oil in said reservoir structure forms a torus during rotation thereof, stationary pressure developing scoop tube means attached to said hollow shaft with the end thereof immersed in said torus of oil when the oil level in said reservoir structure is normal, a source of oil under constant, predetermined pressure connected to said hollow shaft, and means for bleeding oil from said source when the pressure developed at said scoop tube means is equal to the pressure of said source, said oil flowing to said reservoir structure when the pressure at said scoop tube means is less than the pressure of said source whereby the oil in said reservoir structure will be automatically maintained at the normal level.

2. In combination with a rotatable reservoir structure partially filled with oil, a centrally disposed stationary support structure extending into said reservoir structure and about which said reservoir structure rotates whereby the oil in said reservoir structure forms a torus during rotation thereof, stationary, pressure developing scoop means in said reservoir structure with the end thereof immersed in said torus of oil when the oil level in said reservoir structure is normal, a source of oil under constant, predetermined pressure connected to said scoop means, and means for bleeding oil from said source when the pressure developed at said scoop means is equal to the pressure of said source, said oil flowing to said reservoir structure through said scoop means when the pressure at said scoop means is less than the pressure of said source whereby the oil in said reservoir structure will be automatically maintained at the normal level.

3. In combination with a rotatable reservoir structure partially filled with oil, a stationary hollow shaft extending into said reservoir and about which said reservoir structure rotates whereby the oil in said reservoir structure forms a torus during rotation thereof, pressure developing scoop means attached to said hollow shaft with the end thereof immersed in said torus of oil when the oil level in said reservoir structure is normal, a source of oil under constant, predetermined pressure connected to said hollow shaft, and control orifice means for bleeding oil from said source when the pressure developed at said scoop means is equal to the pressure of said source, said oil flowing to said reservoir structure through said scoop means when the pressure at said scoop means is less than the pressure at said source whereby the oil in said reservoir structure will be automatically maintained at the normal level.

4. In a variable pitch propeller having a hub, a gear reduction unit attached to the rear of said hub and a regulator reservoir attached to the front of said hub, in combination including, a stationary support about which said hub and said regulator structure rotates, a stationary pump power gear connected to said stationary support and extending into said regulator reservoir, said regulator reservoir being partially filled with oil, pump means drivingly connected with said pump power gear and disposed within said regulator structure and rotatable therewith whereby said pump means will be activated incident to rotation of said regulator structure about said stationary pump power gear and the oil in said regulator structure forms a torus during rotation thereof, stationary, pressure developing scoop means on said pump power gear with the end thereof immersed in said torus of oil when the oil level in said regulator structure is normal, a lubricating oil system for said gear reduction unit, a bushing having an orifice connected with said oil system for deriving a source of oil under constant, predetermined pressure communicating with said scoop means, and means for bleeding oil from said source when the pressure developed at said scoop means is equal to the pressure of said source, said oil flowing to said regulator structure when the pressure of said scoop means is less than the pressure of said source whereby the oil in said reservoir structure will be automatically maintained at the normal level.

5. The combination set forth in claim 4 wherein said stationary support includes a centrally mounted stationary oil tube extending through said gear reduction unit and said hub, and wherein said bushing is mounted in said oil tube.

6. The combination set forth in claim 5 wherein said stationary pump power gear has a hollow shaft extension in axial alignment with said stationary oil tube and communicating therewith.

7. The combination set forth in claim 5 wherein the means for bleeding oil from said source comprises a control orifice in said oil tube on the outlet side of said bushing.

8. The combination set forth in claim 4 wherein said scoop means comprises a pair of diametrically opposed, radially extending passages having scoops oriented at an angle of 45°.

References Cited by the Examiner

UNITED STATES PATENTS 3,074,688   1/1963   De Muth et al. _____ 253—39.15

MARTIN P. SCHWADRON, *Primary Examiner.*

E. A. POWELL, JR., *Assistant Examiner.*